US011182196B2

(12) United States Patent
Gamage et al.

(10) Patent No.: US 11,182,196 B2
(45) Date of Patent: Nov. 23, 2021

(54) UNIFIED RESOURCE MANAGEMENT FOR CONTAINERS AND VIRTUAL MACHINES

(71) Applicant: VMware, Inc., Palo Alto, CA (US)

(72) Inventors: Sahan Gamage, San Jose, CA (US); Benjamin J. Corrie, Woodinville, WA (US); Adrian Drzewiecki, Mountain View, CA (US); Pranshu Jain, Sunnyvale, CA (US); Mark Johnson, McKinleyville, CA (US); Zhelong Pan, Cupertino, CA (US); Rajesh Venkatasubramanian, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 121 days.

(21) Appl. No.: 16/681,990

(22) Filed: Nov. 13, 2019

(65) Prior Publication Data

US 2021/0141655 A1   May 13, 2021

(51) Int. Cl.
*G06F 9/455* (2018.01)
*G06F 9/50* (2006.01)
*G06F 9/48* (2006.01)

(52) U.S. Cl.
CPC ...... *G06F 9/45558* (2013.01); *G06F 9/45545* (2013.01); *G06F 9/4881* (2013.01); *G06F 9/5027* (2013.01); *G06F 9/5077* (2013.01); *G06F 2009/45583* (2013.01); *G06F 2009/45595* (2013.01); *G06F 2209/504* (2013.01)

(58) Field of Classification Search
CPC ............ G06F 9/45558; G06F 9/5077; G06F 9/45545; G06F 9/4881; G06F 9/5027; G06F 2209/504; G06F 2009/45583
See application file for complete search history.

(56) References Cited

U.S. PATENT DOCUMENTS

| | | | |
|---|---|---|---|
| 2018/0167487 A1* | 6/2018 | Vyas | G06F 9/5027 |
| 2018/0225095 A1* | 8/2018 | Kamalakantha | G06F 8/10 |
| 2018/0307537 A1* | 10/2018 | Chen | G06F 9/4881 |
| 2020/0034254 A1* | 1/2020 | Natanzon | G06F 11/2094 |
| 2020/0314015 A1* | 10/2020 | Mariappan | H04L 41/0806 |

* cited by examiner

*Primary Examiner* — Dong U Kim
(74) *Attorney, Agent, or Firm* — Thomas Horstemeyer, LLP

(57) ABSTRACT

Various aspects are disclosed for unified resource management of containers and virtual machines. A podVM resource configuration for a pod virtual machine (podVM) is determined using container configurations. The podVM comprising a virtual machine (VM) that provides resource isolation for a pod based on the podVM resource configuration. A host selection for the podVM is received from a VM scheduler. The host selection identifies hardware resources for the podVM. A container scheduler is limited to bind the podVM to a node corresponding to the hardware resources of the host selection from the VM scheduler. The podVM is created in a host corresponding to the host selection. Containers are started within the podVM. The containers correspond to the container configurations.

20 Claims, 4 Drawing Sheets

UNIFIED RESOURCE MANAGEMENT FOR CONTAINERS AND VIRTUAL MACHINES

BACKGROUND

Container-based microservices have become an increasingly popular choice for developing large scale software systems. The modular architecture can allow large software components to be deconstructed into smaller, independent, and loosely coupled modules. Because of the small footprint of these individual modules and their often stateless nature, containers are a natural fit as a deployment mechanism.

As the totality of components in the system becomes increasingly large, manual deployments can become prohibitively complex. At the same time, some modern applications cannot be maintained as completely stateless. For example, these applications might rely on database services and logging services.

This poses a problem for existing container management services. Virtual machines can be preferable for stateful services. However, concurrently running virtual machine management services with container management services can result in conflicts where an overlapping set of hardware resources or hosts are subject to the same scheduling constraints for both virtual machines and containers. This can cause underloading, overloading, and placement errors for virtual machines and containers alike. As a result, there is a need for unified resource management for containers and virtual machines.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to unified resource management for containers and virtual machines. Container-based microservices have become an increasingly popular choice for developing large scale software systems. However, some modern applications cannot be maintained as completely stateless, and existing container systems can include burst and other resource expansion modes that can be difficult to administrate. While virtual machines can be preferable for stateful services, concurrently running virtual machine management services with container management services can result in conflicts where an overlapping set of hardware resources or hosts are utilized by both virtual machines and containers, causing underloading, overloading, and placement errors for virtual machines and containers alike. The present disclosure provides a mechanism that unifies the expandability of container systems with the resource predictability of virtual machines systems in a manner that prevents underloading, overloading, and placement errors.

Figure 1:
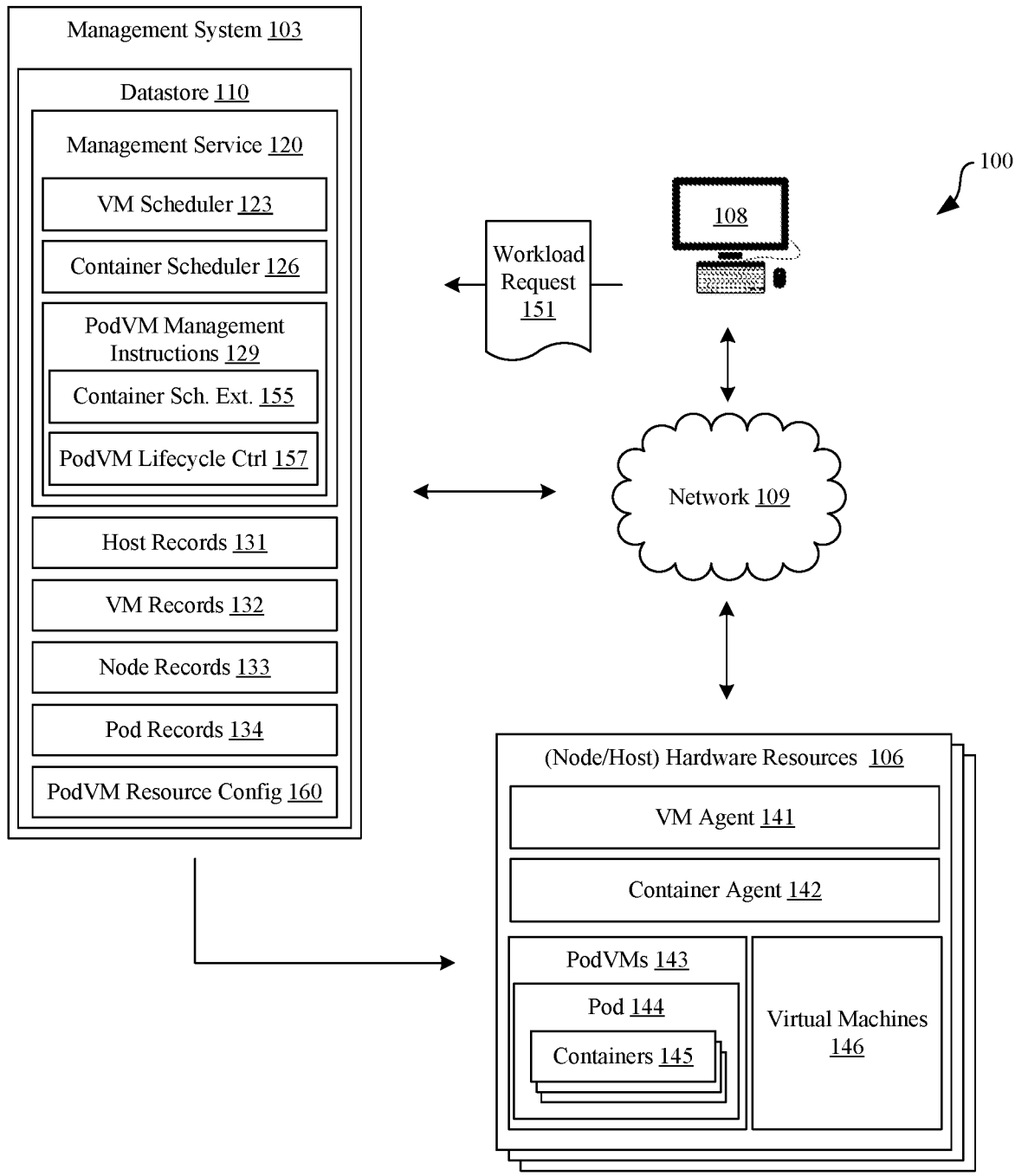
FIG. 1 is a drawing of an example of a networked computing environment that includes a management system, a client device, and hosts.

Turning to FIG. 1, an example of a networked environment 100 is shown. The networked environment 100 can include a management system 103, client device(s) 108, and hardware resources 106 in communication with one other over a network 109. The network 109 can include, for example, the Internet, intranets, extranets, wide area networks (WANs), local area networks (LANs), wired networks, wireless networks, other suitable networks, or any combination of two or more such networks.

The networks can include satellite networks, cable networks, Ethernet networks, telephony networks, and other types of networks. In some examples, the networked environment 100 can serve up virtual desktops to end users and, thus, can also be described as a virtual desktop infrastructure (VDI) environment. In other examples, the networked environment 100 can provide a public cloud computing environment, a private cloud computing environment, or a hybrid cloud computing environment. As such, the networked environment 100 can be referred to as a cloud computing environment in some examples.

The management system 103 can include a server computer or any other system providing computing capability. The management system 103 can provide access to functions for each of a number of different enterprises. While referred to in the singular, the management system 103 can include a plurality of computing devices that are arranged in one or more server banks, computer banks, or other arrangements. The management system 103 can include a grid computing resource or any other distributed computing arrangement. The management system 103 can also include or be operated as one or more virtualized computer instances. For purposes of convenience, the management system 103 is referred to herein in the singular. Even though the management system 103 is referred to in the singular, it is understood that a plurality of management systems 103 can be employed in the various arrangements as described above. The components executed on the management system 103 can include a management service 120 as well as other applications, services, processes, systems, engines, or functionality not discussed in detail herein. The management service 120 can be stored in the datastore 110 of the management system 103.

In various embodiments, the management system 103 can include a plurality of devices installed in racks which can make up a server bank, aggregate computing system, or a computer bank in a data center or other like facility. In some examples, the management system 103 can include high-availability computing systems. A high-availability computing system is a group of computing devices that act as a single system to provide a continuous and constant uptime. The devices in the management system 103 can include any number of physical machines, virtual machines, pods, containers, virtual appliances, and software, such as operating systems, drivers, hypervisors, scripts, and applications.

In some examples, a management system 103 can include a computing environment that includes hundreds or even thousands of physical machines, as well as virtual machines 146 and other software implemented in devices stored in server racks, distributed geographically, and connected to one another through the network 109. It is understood that any virtual machine 146 or other virtual appliance can be implemented using at least one physical device, such as a server or other computing device.

The management system 103 can utilize various hardware resources 106 to enable the operation of workloads including applications, microservices, pods 144, containers 145, and virtual machine 146. The hardware resources 106 can include physical computing hardware including, servers, datastores, memories, and other storage devices, switches, routers, and other network devices, graphics cards having one or more GPUs, central processing units (CPUs), power supplies, and other devices. In various examples, the servers can include requisite physical hardware and software to create and manage virtualization infrastructure or a cloud computing environment. In some examples, the computing resources can also include virtual computing resources, such as virtual machine 146 or other software.

The management service 120 can monitor usage data for the hardware resources 106. In some cases, the hardware resources 106 can include instructions to transmit this usage data to the management service 120. The usage data can include actual usage values and metrics for compute, memory, graphics, temporary storage, persistent storage, and other resources. Errors and other metrics can also be provided in the usage data. The usage data can be included in the host records 131 and node records 133.

The datastore 110 can include memory of the management system 103, mass storage resources of the management system 103, or any other storage resources on which data can be stored by the management system 103. The datastore 110 can include memory and datastores for the hardware resources 106. For instance, the datastore 110 can include one or more relational databases, such as structure query language (SQL) databases, non-SQL databases, or other relational or non-relational databases. The data stored in the datastore 110, for example, can be associated with the operation of the various services or functional entities described below. The datastore 110 can include a database or other memory that includes, for example, a VM scheduler 123, a container scheduler 126, podVM management instructions 129, host records 131, VM records 132, node records 133, and pod records 134.

The VM scheduler 123 can oversee the deployment of workloads that utilize hardware resources 106. For example, the VM scheduler 123 can create, organize, prioritize, distribute, balance, and destroy virtual machine 146, podVMs 143, and other workloads that are assigned to utilize the hardware resources 106. When used in concert with the podVM management instructions 129 and the container scheduler 126, the VM scheduler 123 can also create, destroy, organize, prioritize, distribute, and balance podVMs 143 that are assigned to utilize the hardware resources 106. The VM scheduler 123 can include vSphere® Dynamic Resource Scheduler (DRS), or another virtual machine deployment platform.

A podVM 143 can include a virtual machine that provides resource isolation for a pod 144 based on a podVM resource configuration 160 or size configuration. The podVM 143 can refer to a pod or container-enabled virtual machine that includes a container or pod runtime executable and other prerequisite executables for pod 144 and container 145 deployment. For example, a podVM 143 can include a container runtime executive (CRX) virtual machine, and a CRX virtual machine that provides resource isolation for a pod 144 and its containers 145.

The VM scheduler 123 can utilize resource providers that are referred to as hosts. Each host can refer to a particular set of hardware resources 106. In some cases, each node can execute a VM agent 141 or virtual machine deployment platform instructions associated with a virtual machine deployment platform. The VM agent 141 can enable the VM scheduler 123 to deploy virtual machines and podVMs 143 to the hardware resources 106 of the host. The VM agent 141 can include a vSphere® ESXi executable that includes vSphere® Spherelet.

Resource isolation or tenancy between enterprises, user groups, and users can be provided using resource pools. For example, each hardware resource 106 can be exclusively assigned to a single resource pool at a time. Affinity rules such as affinities and anti-affinities can be provided using virtual machine groups and host groups. For example, a virtual machine 146 or podVM 143 can have an affinity or anti-affinity with a host or another virtual machine 146 or podVM 143. Resource requirements can be defined using a number of vCPUs, memory resources, as well as reservations, limits, and shares for vCPU and memory allocations.

The container scheduler 126 can also be referred to as a container orchestrator. The container scheduler 126 can oversee the deployment of workloads that utilize hardware resources 106. For example, the container scheduler 126 can create, organize, prioritize, distribute, balance, and destroy containers, pods, and other workloads that are assigned to utilize the hardware resources 106. When used in concert with the podVM management instructions 129 and the VM scheduler 123, the container scheduler 126 can also create, destroy, organize, prioritize, distribute, and balance podVMs 143 that are assigned to utilize the hardware resources 106. The container scheduler 126 can include schedulers for Kubernetes (k8s), Swarm, Mesos, or another container deployment platform.

The container scheduler 126 can utilize resource providers that are referred to as nodes. Each node can refer to a particular set of hardware resources 106. In some cases, each node can execute a container agent 142, which can refer to container deployment platform instructions such as a kubelet executable or vSphere® spherelet executable. The container agent 142 can enable the container scheduler 126 to deploy containers and pods to the hardware resources 106 of the node. The container scheduler 126 can schedule workloads referred to as containers, or groups of containers referred to as pods. A container 145 or pod 144 can be deployed to provide functionalities for an enterprise. Resource isolation or tenancy between enterprises, user groups, and users can be provided using namespaces. When podVMs 143 are enabled, a namespace can have a corresponding resource pool with the same set of hardware resources 106. For example, each hardware resource 106 can be exclusively assigned to a single namespace at a time. Affinity rules such as affinities and anti-affinities can be provided using labels or key/value pairs that are attached to pods, containers, and nodes. For example, a pod 144 or container 145 can have an affinity or anti-affinity with a node or another pod 144 or container 145. Resource requirements can be defined using individual container requests and limits, which can be included within a pod specification or a container specification of a workload request 151.

The podVM management instructions 129 can provide a mechanism that allows the VM scheduler 123 and the container scheduler 126 to work in concert without overutilizing, underutilizing, or causing conflicting workload assignments for hardware resources 106. The PodVM management instructions 129 can include a container scheduler extension 155, a podVM lifecycle controller 157, among other modules or components. The container scheduler extension 155 can include a portion of the podVM management instructions 129 installed as a module, component, or other extension of the container scheduler 126. The container scheduler extension 155 provides a predicate function that contacts the VM scheduler 123 to request a host recommendation. Once the host recommendation is received, the container scheduler extension 155 can filter out the nodes based on the recommendation, limiting the container scheduler 126 to select a node with hardware resources 106 corresponding to those of the host provided in the host recommendation. The hardware resource 106 or node selection functionality of the container scheduler 126 are disabled using a configuration policy for the container scheduler 126. The other functions of the container scheduler 126 can execute before the container scheduler extension 155 communicates or transmits a host recommendation and filters the nodes for the container scheduler 126. This can prevent scheduling conflicts between the container scheduler 126 and the VM scheduler 123.

Another task of the container scheduler extension 155 is to understand the resource requirements of a pod 144 defined in a workload request 151, and generate corresponding resource configurations for a podVM 143. The container scheduler extension 155 can identify resource requirements of individual containers 145 of the pod 144 in order to calculate podVM resource configurations 160 for a podVM 143. The container scheduler extension 155 can include the calculated podVM resource configurations 160 for a podVM 143 within a host recommendation request.

In some scheduling workflows, the container scheduler 126 can return a pod-node binding or assignment. The container agent 142 can poll for binding information. The container agent 142 can then carry out the creation of the pod on that node. For podVM 143 creation, a virtual machine instance such as a CRX virtual machine can be created prior to the pod creation process. Because virtual machine creation and power-on times can be about one order of magnitude higher than host recommendation time, and the container scheduler 126 can perform scheduling one pod 144 at a time, synchronous virtual creation and power-on can result in throttling of cluster throughput.

The podVM lifecycle controller 157 can solve this by orchestrating the podVM 143 creation workflow. Using the host recommendation from the container scheduler extension 155, the podVM lifecycle controller 157 can return the node binding and initialize scheduling the next pod without getting blocked for virtual machine creation and power-on. The podVM lifecycle controller 157 can listen to the node binding event and create a podVM 143, for example, by calling one or more API to create and power-on a CRX virtual machine instance or another container-enabled virtual machine. A container-enabled virtual machine can include virtual machines that include a container or pod runtime executable, and other prerequisite executables for pod 144 and container 145 deployment. The podVM 143 can include a unique podVM identifier such as a universally unique identifier (UUID). The unique podVM identifier can be annotated to or included in a pod specification. The VM agent 141 or container agent 142 can identify the podVM 143 for a scheduled workload request 151, and start the pod 144 and containers 145 within the podVM 143.

The podVM lifecycle controller 157 can also monitor and remove or delete podVMs 143. The container scheduler 126 can remove or delete a pod 144 or container 145 that is no longer required. The podVM lifecycle controller 157 can monitor for pod deletion events and delete the corresponding podVM 143. The podVM lifecycle controller 157 can monitor a container scheduler 126 API master, a memory location, or other aspects of the container scheduler 126 to identify pod deletion events. The podVM lifecycle controller 157 can perform the deletion of the corresponding podVM 143 based on the pod deletion events. The podVM lifecycle controller 157 can also monitor for pod creation failures. For example, the podVM lifecycle controller 157 can detect that a container-enabled virtual machine instance or podVM 143 is created, but the pod 144 or its containers 145 are uninstantiated. The podVM lifecycle controller 157 can delete the podVM 143 corresponding to the uninstantiated pod 144 or containers 145.

A host record 131 can represent information related to a hardware resource 106 used as a host for a workload such as an application, microservice, pod, container, or virtual machine. The host record 131 can include information such as the amount of memory installed on the hardware resource 106, the number and type of processors installed on the hardware resource 106, the number and type of GPUs installed on the hardware resource 106, the number and type of network connections installed on the hardware resource 106, and various other data. The host record 131 can also include information related to the virtual machines currently hosted on the hardware resource 106. For example, the host record 131 can include a record of the number of virtual machines hosted on one or more hardware resources 106. As another example, the host record 131 can include a record of the amount and type of computer resources currently allocated to each of the virtual machines deployed to the host. These records can include the number of processor cores, amount of memory, amount of storage, number of GPUs, and the number of network connections. Likewise, the host record 131 can include the amount of allocated computer resources consumed by each of the virtual machines. For example, the host record 131 can include an indication that one virtual machine is consuming 75% of the memory allocated to it and is using 47% of the processor resources allocated to it, while another virtual machine is consuming 15% of the memory allocated to it and is using 97% of the processor resources allocated to it. Some of the virtual machines can be podVMs 143 that are concurrently managed by the VM scheduler, container scheduler 126, as facilitated by the podVM management instructions 129.

A VM record 132 can represent information related to a virtual machine 146 or podVM 143 executing as a guest by a hardware resource 106 of one or more host managed by the VM scheduler 123 and the podVM management instructions 129. For example, this information can include an identifier such as a universally unique identifier (UUID) or name for the virtual machine 146 or podVM 143, a version and type of operating system installed on the virtual machine 146. A VM record 132 can also include the number and type of applications installed on the virtual machine 146 or podVM 143. In some implementations, the VM record 132 can also include a record of the amount and type of computer resources currently allocated to the virtual machine 146 or podVM 143. For example, the VM record 132 can include the number of processor cores, amount of memory, amount of storage, number of GPUs, and the number of network connections assigned to the virtual machine 146 or podVM 143. Likewise, the VM record 132 can include the amount of allocated computer resources currently consumed by the virtual machine 146 or podVM 143. For example, the VM record 132 can include an indication that the VM is consuming 75% of the memory allocated to it and is using 47% of the processor resources allocated to it. In some implementations, this information may be recorded in the VM record 132 on a historical basis, for example hourly, daily, monthly, and so on. A VM record 132 can include a record for a podVM 143, which can refer to a container-enabled virtual machine configured with executables that enable deployment of a pod 144 or a container 145. The VM records 132 can be utilized by the VM scheduler 123 and the podVM management instructions 129.

A node record 133 can represent information related to a hardware resource 106 used as a node for a workload such as an application, microservice, pod 144, container 145, or virtual machine 146. The node record 133 can include information such as the amount of memory installed on the hardware resource 106, the number and type of processors installed on the hardware resource 106, the number and type of GPUs installed on the hardware resource 106, the number and type of network connections installed on the hardware resource 106, and various other data. The node record 133 can also include information related to the virtual machines 146 and podVMs 143 currently hosted on the hardware resource 106. For example, the node record 133 can include a record of the number of pods 144 and containers 145 hosted on one or more hardware resources 106. As another example, the node record 133 can include a record of the amount and type of computer resources currently allocated to the pod 144. These records can include the number of processor cores, amount of memory, amount of storage, number of GPUs, and the number of network connections. Likewise, node records 133 can include the amount of allocated computer resources consumed by the pod 144 and each of the containers 145. For example, the node record 133 can include an indication that a pod 144 is consuming 75% of the memory allocated to it and is using 47% of the processor resources allocated to it, while another pod 144 is consuming 15% of the memory allocated to it and is using 97% of the processor resources allocated to it. Some of the virtual machines 146 can include podVMs 143 that are concurrently managed by the VM scheduler, container scheduler 126, as facilitated by the podVM management instructions 129.

A pod record 134 can represent information related to a pod 144 executing as a guest by a hardware resource 106 of one or more nodes managed by the container scheduler 126 and the podVM management instructions 129. For example, this information can include an identifier or name of the pod 144. A pod record 134 can also include specifications of the containers 145 of the pod 144. A pod record 134 can also include the number and type of applications or functions performed by the pod 144 and its containers 145. In some implementations, the pod record 134 can also include a record of the amount and type of computer resources currently allocated to the pod 144 and its individual containers 145, as well as the individual requirements of each container 145 specified in a pod specification for the pod 144. Likewise, the pod record 134 can include the amount of allocated computer resources currently consumed by the pod 144. For example, the pod record 134 can include an indication that the pod 144 is consuming 75% of the memory allocated to it and is using 47% of the processor resources allocated to it. In some implementations, this information may be recorded in the pod record 134 on a historical basis, for example hourly, daily, monthly, and so on. The pod records 134 can be utilized by the container scheduler 126 and the podVM management instructions 129.

The components executed on the management system 103 can include, for example, a management service 120 as well as other applications, services, processes, systems, engines, or functionality not discussed in detail herein. The management service 120 can be executed to oversee the operation of the networked environment 100 through management of the hardware resources 106 as well as the physical and virtual computing resources that make up the hardware resources 106. In some examples, an enterprise, organization, or other entity can operate the management service 120 to oversee or manage the operation of devices in racks, such as servers, switches, datastores, CPUs, GPUs, power supplies, cooling systems, and other components.

A workload request 151 for a workload such as a pod 144 can be processed to provide function-as-a-service (FaaS) on behalf of an enterprise through public cloud services, private cloud services, hybrid cloud services, or a combination thereof. In another example, the workload request 151 can include requests initiated by employees of an enterprise for remote desktop sessions or other virtualized computing sessions. The workload request 151 can include pods 144 that are processed to provide serverless architecture. Serverless architecture can refer to the management system 103 providing FaaS for a workload request 151. In some cases, the serverless architecture can manage multiple workloads from multiple workload requests 151, which collectively provide a larger service for the enterprise. The management service 120 can organize and execute the workloads in virtual machines 146, podVMs 143, pods 144, and containers 145, and further provide persistent data for the workloads using hardware resources 106 without requiring an enterprise, developer, or administrator to configure and maintain a specific proprietary server. The framework for podVM 143 implementation can also be utilized in proprietary hardware resources 106 maintained, administrated, owned, or operated by an enterprise.

Figure 2:
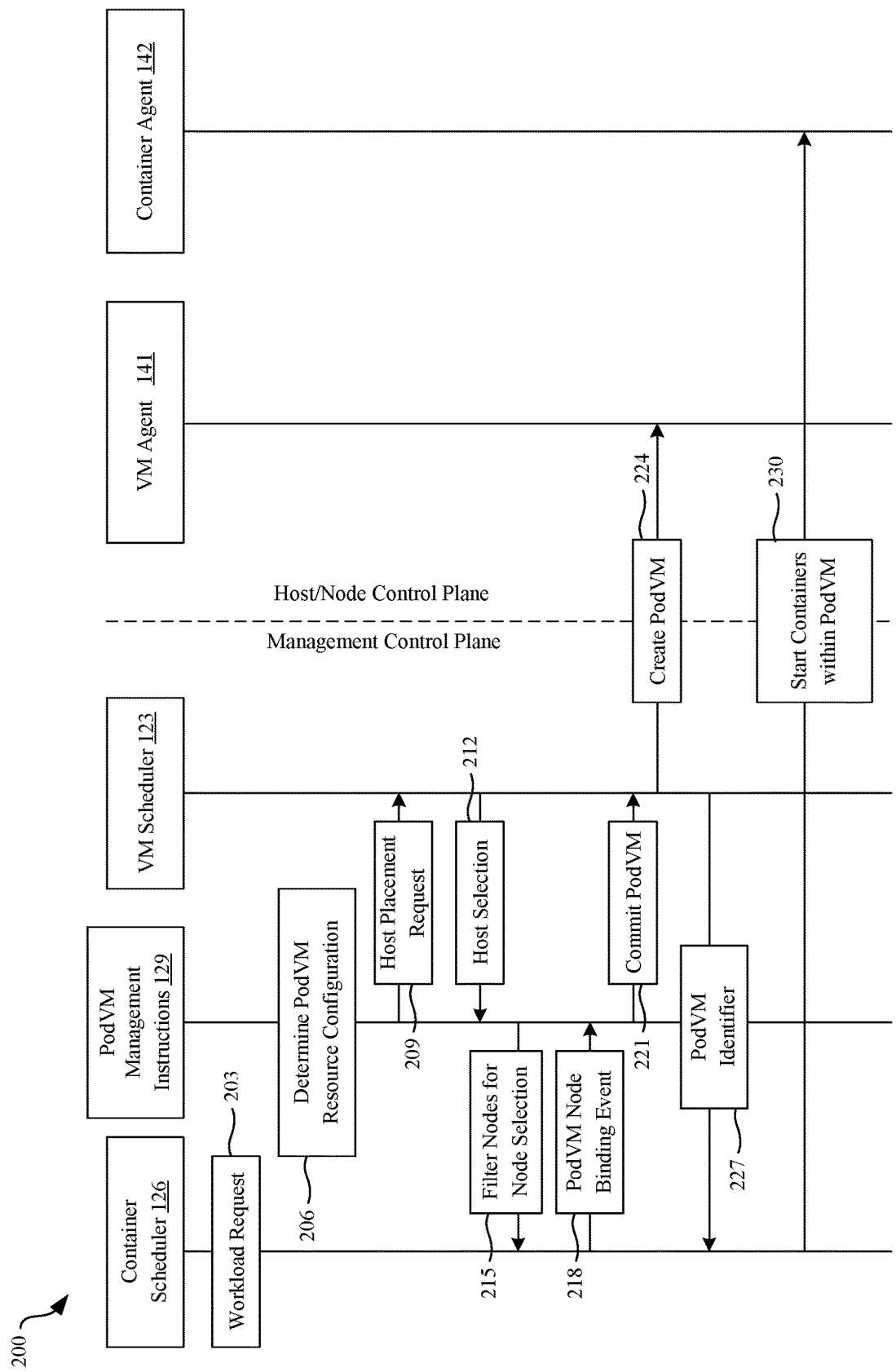
FIG. 2 is a sequence diagram illustrating an example of functionalities implemented by components of the networked computing environment of FIG. 1.

In FIG. 2, shown is a sequence diagram 200 that provides one example of the operation of a portion of the networked environment 100. The sequence diagram 200 outlines how the components of the networked environment 100 work in concert for unified resource management of containers and virtual machines using podVMs 143. Generally, the sequence diagram 200 outlines unified resource management for creation of a podVM 143 based on a workload request 151.

In step 203, the container scheduler 126 can receive a workload request 151. The workload request 151 can be generated by the management service 120 based on operating conditions or demands for a particular functionality. The management service 120 can transmit or communicate the workload request 151 to the container scheduler 126. In other cases, the workload request 151 can be received from a client device 108. For example, an administrator can request deployment of a workload by transmitting the workload request 151 to the management service 120, which can provide the workload request 151 to its container scheduler 126. The workload request 151 can include a pod specification for a pod 144. The pod specification can include container specifications for the containers 145 of the pod 144.

In step 206, the podVM management instructions 129 can determine a podVM resource configuration 160. The podVM management instructions 129 can include a container scheduler extension 155, which can be installed or configured as an extension of the container scheduler 126. The container scheduler extension 155 can identify the resource requirements of a pod 144 defined in a workload request 151, and generate a podVM resource configuration 160. The container scheduler extension 155 can identify resource requirements of individual containers 145 of the pod 144 in order to calculate podVM resource configurations 160.

In step 209, podVM management instructions 129 can communicate or transmit a host placement request to the VM scheduler 123. For example, the container scheduler extension 155 can transmit the host placement request along with the podVM resource configuration 160 for the pod 144.

In step 212, the VM scheduler 123 can return a host selection to the container scheduler extension 155 based on the podVM resource configurations 160. The VM scheduler 123 can analyze the host records 131 to determine the host selection. The host selection can include a host that specifies a particular hardware resource 106 or set of hardware resources 106 for the podVM resource configurations 160. Once the VM scheduler 123 selects a host, the host selection can be transmitted to the container scheduler extension 155.

In step 215, the container scheduler extension 155 can filter nodes for node selection. Generally, the container scheduler 126 can determine a node selection analogous to the host selection performed by the VM scheduler 123. However, a node selection and a host selection are made for podVM 143 deployment, and deployment can fail if the node selection and the host selection conflict with one another. If these selections differ, a container-enabled virtual machine can be created on a separate set of hardware resources 106 from the pod 144, or both processes can fail.

The container scheduler extension 155 can ensure that the node selection corresponds to the host selection by filtering a set of nodes, such as those of a namespace, that are available to the container scheduler 126. The container scheduler extension 155 can filter out all nodes other than a node that corresponds to the host selection made by the VM scheduler 123. The hardware resources 106 specified by the selected host can be the same hardware resources 106 specified by the node available to the container scheduler 126 after filtering. In other words, the container scheduler extension 155 can limit the container scheduler 126 to select a node that corresponds to the host selection made by the VM scheduler 123.

In step 218, the podVM lifecycle controller 157 can detect a node binding event. The container scheduler 126 can bind the pod 144 to a node based on the node selection limitations applied by the container scheduler extension 155. The podVM lifecycle controller 157 of the podVM management instructions 129 can listen or poll the container scheduler 126 for node binding events.

In step 221, the podVM lifecycle controller 157 can cause the VM scheduler 123 to commit the podVM 143. Once a node binding event is detected, the podVM lifecycle controller 157 can transmit a command to commit the podVM 143 to the selected host. For example, the podVM lifecycle controller 157 can transmit a podVM creation request to the VM scheduler 123. Such a request can be transmitted by calling a virtual machine creation API associated with the VM scheduler 123 to create a container-enabled virtual machine or podVM 143. The podVM lifecycle controller 157 can also call a power-on API to power-on the container-enabled virtual machine or podVM 143.

In step 224, the VM scheduler 123 can create the podVM 143. The VM scheduler 123 can coordinate with the VM agent 141 to create a podVM 143 using hardware resources 106 specified by the host selection. A universally unique identifier or UUID can be created and assigned to the podVM 143.

In step 227, the podVM lifecycle controller 157 can identify the unique identifier of the podVM 143 and annotate a pod specification for the pod 144 to include the unique identifier of the podVM 143 that was created for the pod 144. The podVM lifecycle controller 157 can provide the unique identifier of the podVM 143 to the container scheduler 126. The container agent 142 can retrieve or identify the podVM 143 from the container scheduler 126.

In step 230, the container agent 142 can start or create a pod 144 and its containers 145 within the podVM 143. The container agent 142 can initiate execution of the pod 144 and its containers 145 in the appropriate podVM 143 based on the unique identifier of the podVM 143.

Figure 3:
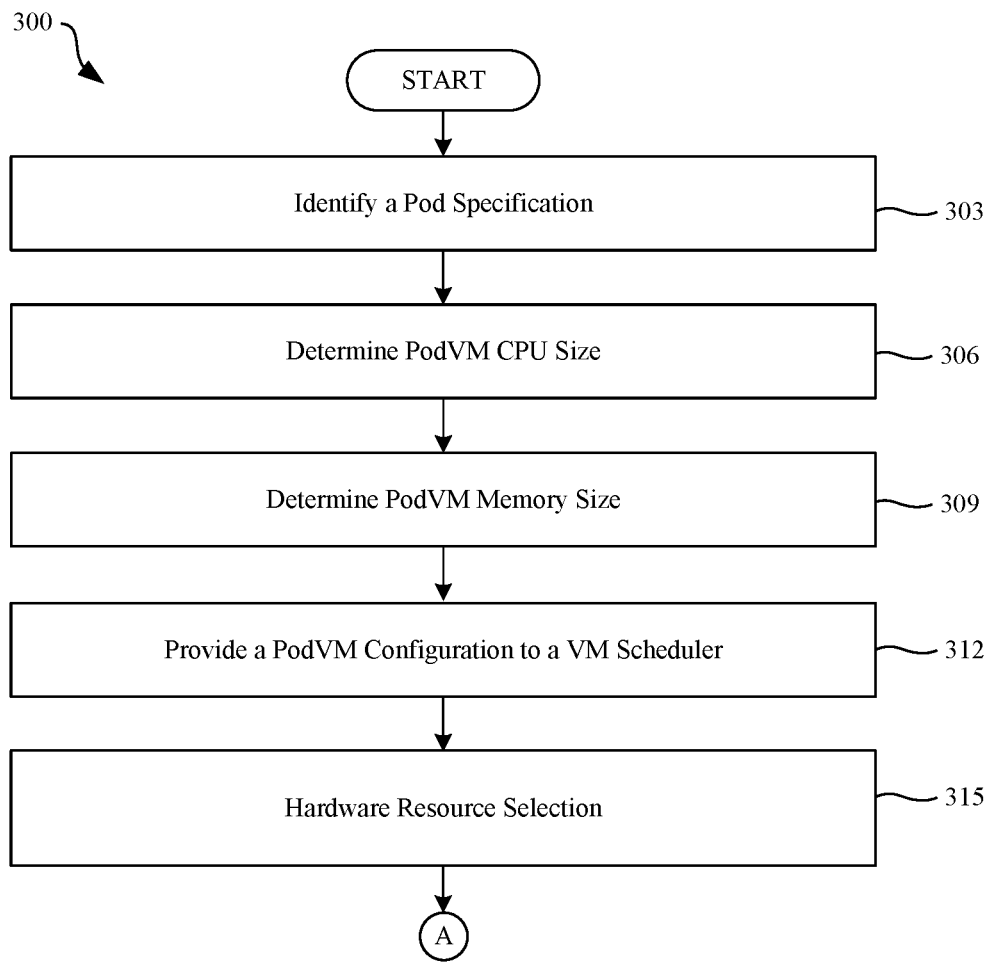
FIG. 3 is a flowchart illustrating functionalities implemented by components of the networked computing environment of FIG. 1.

FIG. 3 shows a flowchart 300 that provides one example of the operation of a portion of the networked environment 100. The flowchart 300 can be viewed as depicting one example of the operation of the container scheduler extension 155 in concert with the other components of the networked environment 100. Generally, the flowchart 300 shows how the container scheduler extension 155 determines a podVM resource configuration 160 based on a workload request 151 and coordinates selections of hardware resources 106 between the VM scheduler 123 and the container scheduler 126.

In step 303, the container scheduler extension 155 can identify a pod specification for a pod 144. For example, the container scheduler 126 can receive a workload request 151. The workload request 151 can include the pod specification for the pod 144. Because the container scheduler extension 155 can be a module or an extension of the container scheduler 126, the container scheduler extension 155 can access the workload request 151 to identify the pod specification. An example pod specification of a workload request 151 is provided in Table 1.

TABLE 1

| | |
|---|---|
| apiVersion: v1 | limits: |
| kind: Pod |   memory: "128Mi" |
| metadata: |   cpu: "500m" |
|   name: frontend | - name: wp |
| spec: |   image: wordpress |
|   containers: |   resources: |
|   - name: db |     requests: |
|     image: mysql |       memory: "64Mi" |
|     resources: |       cpu: "250m" |
|       requests: |     limits: |
|         memory: "64Mi" |       memory: "128Mi" |
|         cpu: "250m" |       cpu: "500m" |

The pod specification can include a name or identifier of the pod 144. The pod specification can also specify an identifier of each container 145, an image for each container 145, and resource requests and resource limits for each container 145. In some cases, the pod specification can omit one or more of the resource requests and resource limits for a container 145.

The limits for containers can, in practice, be used as a safeguard rather than the actual definition of the resource requirement. This can be particularly true for burstable pods 144, which can expand their resource usage as required. A limit for a container 145 can be designed to prevent it from occupying an entire node or host in response to an error or a misconfiguration, rather than defining the actual maximum amount of resources a container 145 is predicted to consume. If the resource limit for a pod can be inferred as the sum of the limits of the containers, the result could be relatively large. This can pose a challenge for podVMs 143, which have a defined podVM CPU size that cannot be exceed by executables therein. The podVM CPU size can refer to a number of virtual central processing units (vCPUs) that are allocated to a podVM 143. A podVM 143 can also have a defined podVM memory size that cannot be exceed. In some cases, a resource limit may not be defined, for example, for best effort pods 144. If very large CPU limits are specified for containers 145, then the podVM 143 can be prevented from being admitted to a host or hardware resource 106 by the VM agent 141. In addition, if admitted, the memory scheduling of the VM agent 141 and the VM scheduler 123 can become unmanageable. The container scheduler extension 155 includes mechanisms that can prevent these issues through its podVM CPU size calculations.

In step 306, the container scheduler extension 155 can determine a podVM CPU size. In order to determine the podVM CPU size, an optimal CPU size of each container 145 and each pod 144 can be determined. If a CPU limit is set for a container 145, its optimal CPU size is this CPU limit. If the CPU limit is unset for a container, its CPU request can be used, or a predetermined default capacity per-container can be assigned as its optimal CPU size if each of the CPU limit and request are unset. In some cases, the default capacity can also be used if greater than each of the CPU limit and CPU request. The optimal CPU size of a podVM 143 can be the sum of the optimal CPU sizes for its containers 145. Equation 1 can describe optimal CPU size $CPU_{opt}$ for a podVM 143 as a summation, for all containers 145, of the maximum of the default CPU capacity, the CPU request, and the CPU limit for each container 145.

$$CPU_{opt} = \Sigma \max(\text{default CPU capacity}, \text{CPU request}, \text{CPU limit}) \quad (1)$$

The container scheduler extension 155 can also determine a podVM CPU reservation for the podVM 143. The podVM CPU reservation $CPU_{res}$ for the podVM 143 can be a sum of the CPU requests of the containers 145, plus a predetermined padding added for the container agent 142. This relationship can be described using equation 2.

$$CPU_{res} = (\Sigma CPU \text{request}) + CPU \text{padding} \quad (2)$$

The container scheduler extension 155 can determine the podVM CPU size by determining a minimum of the optimal CPU size for a podVM 143 and its maximum deployable CPU size. The maximum deployable CPU size can be a predetermined size, for example, specified by an administrator. The container scheduler extension 155 can calculate podVM CPU size, $CPU_{size}$, as a maximum between the podVM CPU reservation and the minimum of the optimal CPU size for a podVM 143 and its maximum deployable size. This relationship can be described using equation 3.

$$CPU_{size} = \max(\min(CPU_{opt}, \text{Max Deployable CPU Size}), CPU_{res}) \quad (3)$$

This ensures that the podVM CPU size is at least its podVM CPU reservation. The container scheduler extension 155 can store the podVM CPU size and the podVM CPU reservation within the podVM resource configuration 160.

In step 309, the container scheduler extension 155 can determine a podVM memory size. In order to determine the podVM memory size, the container scheduler extension 155 can determine a constrained memory limit for the podVM 143. The constrained memory limit for the podVM 143 can be a maximum of the memory limits of the containers 145, if the sum of the memory limits of the containers 145 is greater than a predetermined factor multiplied by a sum of the memory requests of the containers 145. Otherwise, the constrained memory limit can be the sum of the memory limits. This relationship can be described using equation 4.

$$\text{constrained memory limit} = \begin{cases} \max(\text{memory limits}), & \text{if } \Sigma \text{ memory limits} > (\Sigma \text{ memory requests} \times 3) \\ \Sigma \text{ limits}, & \text{otherwise} \end{cases} \quad (4)$$

The predetermined factor in equation 4 is indicated to be three. Another factor can also be chosen.

The container scheduler extension 155 can also determine a podVM memory reservation for the podVM 143. The podVM memory reservation $MEM_{res}$ for the podVM 143 can be a sum of the memory requests of the containers 145, plus a predetermined memory padding added for the guest operating system. This relationship can be described using equation 5.

$$MEM_{res} = (\Sigma MEM \text{request}) + MEM \text{padding} \quad (5)$$

The container scheduler extension 155 can determine the podVM CPU size by determining a minimum between the constrained memory limit and a maximum deployable memory size. The maximum deployable memory size can be a predetermined size, for example, specified by an administrator.

The container scheduler extension 155 can calculate the $MEM_{size}$ as a maximum between a summation of the memory requests, and the lower value between the constrained memory limit and the maximum deployable size, this maximum can be added to the memory padding for the guest operating system. This relationship can be described using equation 6.

$$MEM_{size} = \max(\Sigma MEM \text{requests}, \min(\text{ConstrMEMlimit}, \text{MaxDeplyMEM Size})) + \text{Guest OS MEM padding} \quad (6)$$

The container scheduler extension 155 can store the podVM memory size and the podVM memory reservation within the podVM resource configuration 160. The podVM resource configuration 160 can be generated in a format that is compatible with the VM scheduler 123.

In step 312, the container scheduler extension 155 can provide the podVM resource configuration 160 to the VM scheduler 123. The podVM resource configuration 160 can include the podVM CPU size and the podVM CPU reservation, the podVM memory size, and the podVM memory reservation. The container scheduler extension 155 can transmit a host placement request to the VM scheduler 123. The host placement request can include the podVM resource configuration 160. In some examples, the container scheduler extension 155 can identify additional container scheduling restraints determined by the container scheduler 126, and can include the container scheduling restraints in the host placement request. For example, container affinity rules between other containers or hardware resources 106 can be included in the host placement request.

In step 315, the container scheduler extension 155 can perform a hardware resource selection functionality. For example, the VM scheduler 123 can return a host selection to the container scheduler extension 155 based on host placement request. The host selection can refer to a host that specifies hardware resources 106 for the podVM 143 based on the podVM resource configuration 160. The container scheduler extension 155 can filter nodes for hardware resource selection. The container scheduler extension 155 can filter out all nodes other than a node that corresponds to the host selection made by the VM scheduler 123 in order to limit the container scheduler 126 to select a node that corresponds to the host selection made by the VM scheduler 123. The process can then move to connector A, which is continued in FIG. 4.

Figure 4:
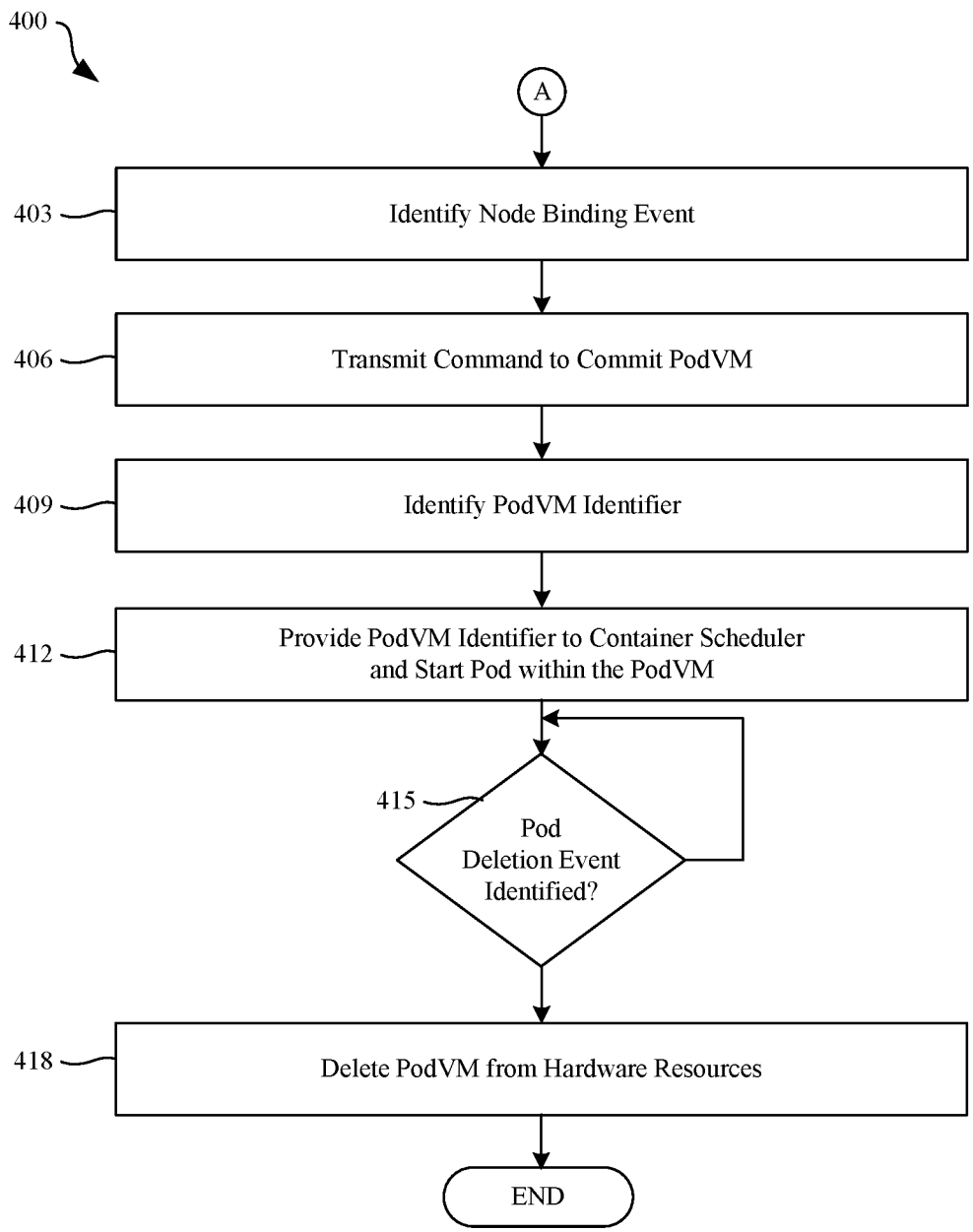
FIG. 4 is a flowchart illustrating additional functionalities implemented by components of the networked computing environment of FIG. 1.

FIG. 4 shows a flowchart 400 that provides one example of the operation of a portion of the networked environment 100. The flowchart 400 can be viewed as depicting one example of the operation of the podVM lifecycle controller 157 in concert with the other components of the networked environment 100. Generally, the flowchart 400 shows how the podVM lifecycle controller 157 identifies a node binding event and starts the pod 144 and containers 145 in the podVM 143.

In step 403, the podVM lifecycle controller 157 can identify a node binding event. The podVM lifecycle controller 157 of the podVM management instructions 129 can listen or poll the container scheduler 126 for node binding events. The container scheduler 126 can bind the pod 144 to a node based on the node selection limitations applied by the container scheduler extension 155. The podVM management instructions 129 can detect this binding and move to step 406.

In step 406, the podVM lifecycle controller 157 can transmit a command to commit a podVM 143. For example, once a node binding event is detected, the podVM lifecycle controller 157 can transmit a command to commit the podVM 143 to a host that was previously selected by the VM scheduler 123. In other words, the podVM lifecycle controller 157 can transmit a podVM creation request to the VM scheduler 123. Such a request can be transmitted by calling a virtual machine creation API associated with the VM scheduler 123 to create a container-enabled virtual machine or podVM 143. The podVM lifecycle controller 157 can also call a power-on API to power-on the container-enabled virtual machine or podVM 143.

In step 409, the podVM lifecycle controller 157 can identify a podVM identifier of a podVM 143. The podVM 143 can be assigned a unique podVM identifier such as a universally unique identifier (UUID) once the podVM 143 is committed or created on a particular hardware resource 106. For example, the VM agent 141 or the VM scheduler 123 can assign a unique podVM identifier to the podVM 143. The podVM lifecycle controller 157 can identify the unique podVM identifier from the VM agent 141. In some cases, the podVM lifecycle controller 157 can annotate a pod specification of a pod 144 with the unique podVM identifier or UUID.

In step 412, the podVM lifecycle controller 157 can provide the podVM identifier to the container scheduler 126. The podVM lifecycle controller 157 can provide the annotated pod specification to the container scheduler 126. In other cases, the podVM lifecycle controller 157 can transmit the podVM identifier to the container scheduler 126 and the container scheduler 126 can annotate the pod specification of a pod 144 with the unique podVM identifier or UUID. The pod 144 and containers 145 can then be started within the appropriate podVM 143, based on the unique podVM identifier or UUID. The container scheduler 126 can communicate with the container agent 142 to start the pod 144 and containers 145 in the podVM 143.

In step 415, the podVM lifecycle controller 157 can determine whether a pod deletion event is identified. The podVM lifecycle controller 157 can monitor for pod deletion events. The podVM lifecycle controller 157 can monitor a container scheduler 126 API master, a memory location, or other aspects of the container scheduler 126 to identify pod deletion events. The podVM lifecycle controller 157 can perform the deletion of the corresponding podVM 143 based on the pod deletion events. The podVM lifecycle controller 157 can also monitor for pod creation failures. For example, a pod deletion event can be triggered by the podVM lifecycle controller 157 detecting a deployment failure such as a container-enabled virtual machine instance or podVM 143 being created, while an associated pod 144 and its containers 145 are uninstantiated.

In step 418, the podVM lifecycle controller 157 can delete a podVM 143. For example, the podVM lifecycle controller 157 can identify, based on the container scheduler 126 API, that a lifecycle of a pod 144 is completed. In response to this pod deletion event, the podVM lifecycle controller 157 can remove the podVM 143 from the hardware resources 106. Likewise, the podVM lifecycle controller 157 can remove the podVM 143 from the hardware resources 106 in response to a deployment failure.

Stored in the memory device are both data and several components that are executable by the processor. Also stored in the memory can be a datastore 110 and other data. A number of software components are stored in the memory and executable by a processor. In this respect, the term "executable" means a program file that is in a form that can be ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Client devices 108 can be used to access user interfaces generated to configure or otherwise interact with the management service 120. These client devices 108 can include a display upon which a user interface can be rendered. In some examples, the user interface can be generated using user interface data provided by the management system 103. The client device 108 can also include one or more input/output devices that can include, for example, a capacitive touchscreen or other type of touch input device, fingerprint reader, or keyboard.

Although the management service 120 and other various systems described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system comprising:
   at least one computing device comprising at least one processor;
   at least one memory comprising executable instructions, wherein the instructions, when executed by the at least one processor, cause the at least one computing device to at least:
   determine, by a container scheduler extension of a container scheduler that deploys containers and pods within a computing environment, based on at least one container configuration, a podVM resource configuration for a pod virtual machine (podVM), the podVM comprising a virtual machine (VM) that provides resource isolation for a pod based on the podVM resource configuration;
   disable, by the container scheduler extension, a node selection functionality of the container scheduler to prevent conflicts between the container scheduler and a VM scheduler that deploys VMs within the computing environment;
   transmit, from the container scheduler extension to a VM scheduler, a request for a host selection for the VM of the podVM based on the podVM resource configuration, wherein the host selection is received from the VM scheduler, and the host selection identifies hardware resources for the podVM;
   limit, by the container scheduler extension, the container scheduler to bind the pod of the podVM to a node corresponding to the hardware resources of the host selection received from the VM scheduler;
   create the podVM in a host corresponding to the host selection; and
   execute at least one container within the podVM created in the host, the at least one container corresponding to the at least one container configuration.

2. The system of claim 1, wherein the instructions, when executed by the at least one processor, cause the at least one computing device to at least:
   identify a workload request comprising the at least one container configuration.

3. The system of claim 1, wherein the podVM resource configuration comprises at least one of: a central processing unit (CPU) resource, and a memory resource.

4. The system of claim 3, wherein the memory resource is determined based on the at least one container configuration and guest operating system memory padding value for a guest operating system.

5. The system of claim 3, wherein the CPU resource is determined based on the at least one container configuration and a container agent CPU padding value for a container agent associated with the container scheduler.

6. The system of claim 3, wherein the instructions, when executed by the at least one processor, cause the at least one computing device to at least:
   determine the CPU resource based on a maximum between: a summation of at least one CPU request value corresponding to the at least one container configuration, and a minimum of: a summation of at least one selected CPU value corresponding to the at least one container configuration, and a predetermined maximum CPU resource, wherein a respective one of the at least one CPU request value and the at least one selected CPU value indicates a corresponding measure of CPU size.

7. The system of claim 6, wherein the summation of at least one selected CPU value is determined based on a sum of a respective CPU value of the at least one selected CPU value for a respective one of the at least one container configuration, the respective CPU value being selected as a maximum of: a CPU request of a respective one of the at least one container configuration, a CPU limit of the respective one of the at least one container configuration, and a predetermined default CPU capacity.

8. A non-transitory computer-readable medium, comprising executable instructions, wherein the instructions, when executed by at least one processor, cause at least one computing device to at least:
   determine, by a container scheduler extension of a container scheduler, based on at least one container configuration, a podVM resource configuration for a pod virtual machine (podVM), the podVM comprising a virtual machine (VM) that provides resource isolation for a pod based on the podVM resource configuration;
   disable, by the container scheduler extension, a node selection functionality of the container scheduler;
   receive, by the container scheduler extension, from a VM scheduler, a host selection in response to a request that specifies at least a portion of the podVM resource configuration, wherein the host selection identifies hardware resources;
   limit, by the container scheduler extension, the container scheduler to bind the pod of the podVM to a node corresponding to the hardware resources of the host selection received from the VM scheduler, wherein the container scheduler extension prevents conflicts between the container scheduler and the VM scheduler by disabling the node selection functionality and limiting the container scheduler to bind the pod based on the host selection;
   create the podVM in a host corresponding to the host selection; and
   execute at least one container within the podVM created in the host, the at least one container corresponding to the at least one container configuration.

9. The non-transitory computer-readable medium of claim 8, wherein the instructions, when executed by the at least one processor, cause the at least one computing device to at least:
   identify a workload request comprising the at least one container configuration.

10. The non-transitory computer-readable medium of claim 8, wherein the podVM resource configuration comprises at least one of: a central processing unit (CPU) resource, and a memory resource.

11. The non-transitory computer-readable medium of claim 10, wherein the memory resource is determined based on the at least one container configuration and guest operating system memory padding value for a guest operating system.

12. The non-transitory computer-readable medium of claim 10, wherein the CPU resource is determined based on the at least one container configuration and a container agent CPU padding value for a container agent associated with the container scheduler.

13. The non-transitory computer-readable medium of claim 10, wherein the instructions, when executed by the at least one processor, cause the at least one computing device to at least:
   determine the CPU resource based on a maximum between: a summation of at least one CPU request value corresponding to the at least one container configuration, and a minimum of: a summation of at least one selected CPU or value corresponding to the at least one container configuration, and a predetermined maximum CPU resource, wherein a respective one of the at least one CPU request value and the at least one selected CPU value indicates a corresponding measure of CPU size.

14. The non-transitory computer-readable medium of claim 13, wherein the summation of at least one selected CPU value is determined based on a sum of a respective CPU value of the at least one selected CPU value for a respective one of the at least one container configuration, the respective CPU value being selected as a maximum of: a CPU request of a respective one of the at least one container configuration, a CPU limit of the respective one of the at least one container configuration, and a predetermined default CPU capacity.

15. A method performed by instructions executed by at least one processor, the instructions comprising:
   determining, by a container scheduler extension of a container scheduler, based on at least one container configuration, a podVM resource configuration for a pod virtual machine (podVM), the podVM comprising a virtual machine (VM) that provides resource isolation for a pod based on the podVM resource configuration;
   disabling, by the container scheduler extension, a node selection functionality of the container scheduler;
   receiving, by the container scheduler extension, from the VM scheduler, a host selection in response to a request that specifies at least a portion of the podVM resource configuration, wherein the host selection identifies hardware resources;
   limiting, by the container scheduler extension, the container scheduler to bind the pod of the podVM to a node corresponding to the hardware resources of the host selection received from the VM scheduler a container scheduler to bind the podVM to a node corresponding to the hardware resources of the host selection from the VM scheduler;
   creating the podVM in a host corresponding to the host selection; and
   executing at least one container within the podVM created in the host, the at least one container corresponding to the at least one container configuration.

16. The method of claim 15, further comprising:
   identifying a workload request comprising the at least one container configuration.

17. The method of claim 15, wherein the podVM resource configuration comprises at least one of: a central processing unit (CPU) resource, and a memory resource.

18. The method of claim 17, wherein the memory resource is determined based on the at least one container configuration and guest operating system memory padding value for a guest operating system.

19. The method of claim 17, wherein the CPU resource is determined based on the at least one container configuration and a container agent CPU padding value for a container agent associated with the container scheduler.

20. The method of claim 17, further comprising determining the CPU resource based on a maximum between: a summation of at least one CPU request value corresponding to the at least one container configuration, and a minimum of: a summation of at least one selected CPU value corresponding to the at least one container configuration, and a predetermined maximum CPU resource, wherein a respective one of the at least one CPU request value and the at least one selected CPU value indicates a corresponding measure of CPU size.

* * * * *